United States Patent
Cai et al.

(10) Patent No.: US 10,705,941 B1
(45) Date of Patent: Jul. 7, 2020

(54) COMPRESSED TRACE LOG

(71) Applicant: Oracle International Corporation, Redwood Shores, CA (US)

(72) Inventors: Li Cai, Beijing (CN); Mofeng Ma, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 8 days.

(21) Appl. No.: 16/233,425

(22) Filed: Dec. 27, 2018

(51) Int. Cl.
G06F 9/44 (2018.01)
G06F 11/36 (2006.01)
G06F 11/34 (2006.01)

(52) U.S. Cl.
CPC ...... *G06F 11/3636* (2013.01); *G06F 11/3476* (2013.01); *G06F 11/3664* (2013.01); *G06F 2201/865* (2013.01)

(58) Field of Classification Search
CPC ............. G06F 11/3636; G06F 11/3466; G06F 11/3476; G06F 2201/865; G06F 11/3409
USPC ........................................................ 717/128
See application file for complete search history.

(56) References Cited

U.S. PATENT DOCUMENTS

| | | | |
|---|---|---|---|
| 7,774,760 B2 | 8/2010 | Mishra et al. | |
| 7,810,075 B2 | 10/2010 | Dostert et al. | |
| 7,975,262 B2 | 7/2011 | Cozmei | |
| 8,464,221 B2 | 6/2013 | Zheng et al. | |
| 9,892,417 B2 | 2/2018 | Shachar et al. | |
| 10,048,075 B2 | 8/2018 | Wang | |
| 2005/0160431 A1 | 7/2005 | Srivastava et al. | |
| 2009/0313460 A1 | 12/2009 | Huang et al. | |
| 2015/0066881 A1 | 3/2015 | Sundaram et al. | |

*Primary Examiner* — Chuck O Kendall
(74) *Attorney, Agent, or Firm* — Tarolli, Sundheim, Covell & Tummino LLP

(57) ABSTRACT

A method for debugging a program includes executing, by a computing platform, a given program with a plurality of loops. Each of the plurality of loops includes multiple candidate iterations, and each loop in the given program includes a set of executable statements. A particular loop of the plurality of loops can include at least a particular iteration and one or more other iterations. The method can also include executing at least the particular iteration and the one or more other iterations for the particular loop. During execution of at least the particular iteration and the one or more other iterations for the particular loop, information that indicates which iteration of the particular loop is being executed is stored. Further, the method includes discarding temporarily stored information about the one or more other iterations without storing the information in the log.

20 Claims, 10 Drawing Sheets

```
For &m = 1 To &PrcsOutputTypeRecList.Len
  Local Record &PRCSOUTPUTTYPE_REC = &PrcsOutputTypeRecList [&m];
  If &genprcs = &PRCSOUTPUTTYPE_REC.GENPRCSTYPE.Value Then
End-For;
```

— 100

```
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
335:    End-For;
330:    For &m = 1 To &PrcsOutputTypeRecList.Len
331:      Local Record &PRCSOUTPUTTYPE_REC = &PrcsOutputTypeRecList [&m];
332:      If &genprcs = &PRCSOUTPUTTYPE_REC.GENPRCSTYPE.Value Then
333:        Return &PRCSOUTPUTTYPE_REC.OUTDESTTYPE.Value;
```

COMPRESSED TRACE LOG

TECHNICAL FIELD

The present disclosure relates to debugging a program. More particularly, this disclosure relates to systems and methods for generating a trace log to debug a program.

BACKGROUND

Tracing is an approach for logging the state of computer applications at different points during its course of execution. Tracing may be implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

SUMMARY

One example relates to a method for debugging a program. The method includes executing, by a computing platform, a given program that includes a plurality of loops, each of the plurality of loops includes multiple candidate iterations, wherein each loop in the given program includes a set of executable statements. A particular loop of the plurality of loops includes at least a particular iteration and one or more other iterations. The method also includes executing at least the particular iteration and the one or more other iterations for the particular loop. During execution of at least the particular iteration and the one or more other iterations for the particular loop, the method includes storing information that indicates which iteration of the particular loop is being executed. Additionally, during execution of at least the particular iteration, the method includes determining if a trace log condition is met for retaining the stored information for the particular loop even after the particular loop has finished execution. Further, based on determining that the trace log condition is met for at least the particular iteration, the method include storing, in a log that persists even after the particular loop has finished execution, information that identifies the particular iteration and indicates which statements of a plurality of statements in the particular loop were executed during the particular iteration. Based on determining that the trace log condition is not met for the one or more other iterations, the method includes discarding temporarily stored information about the one or more other iterations without storing the information in the log. Further, after the particular iteration and the one or more other iterations have been executed, the method yet further includes storing the log in association with the particular loop, as a summary of how the particular loop was executed, even though the summary omits how the one or more other iterations were executed.

Another example relates to a non-transitory computer-readable storage medium storing program instructions that when executed by a computing platform operating on a device cause the computing platform to perform operations. The operations include executing, by a computing platform, a given program that includes a plurality of loops, each of the plurality of loops includes multiple candidate iterations, wherein each loop in the given program includes a set of executable statements. A particular loop of the plurality of loops includes at least a particular iteration and one or more other iterations. The operations also include executing at least the particular iteration and the one or more other iterations for the particular loop. During execution of at least the particular iteration and the one or more other iterations for the particular loop, the operations include storing information that indicates which iteration of the particular loop is being executed. Additionally, during execution of at least the particular iteration and the one or more other iterations for the particular loop, the operations include determining if a trace log condition is met for retaining the stored information for the particular loop even after the particular loop has finished execution. Based on determining that the trace log condition is met for at least the particular iteration, the operations include storing, in a log that persists even after the particular loop has finished execution, information that identifies the particular iteration and indicates which statements of a plurality of statements in the particular loop were executed during the particular iteration. Moreover, based on determining that the trace log condition is not met for the one or more other iterations, the operations include discarding temporarily stored information about the one or more other iterations without storing the information in the log. After the particular iteration and the one or more other iterations have been executed, the operations include storing the log in association with the particular loop, as a summary of how the particular loop was executed, even though the summary omits how the one or more other iterations were executed.

Yet another example relates to a system that includes a non-transitory memory to store machine readable instructions. The system also includes a processor to access the memory and execute the machine readable instructions. The machine readable instructions include a given program that includes a plurality of loops, each of the plurality of loops includes multiple candidate iterations. Each loop in the given program includes a set of executable statements. A particular loop of the plurality of loops includes at least a particular iteration and one or more other iterations. The machine readable instructions also include a runtime environment that executes the given program, wherein at least the particular iteration and the one or more other iterations for the particular loop are executed. During execution of at least the particular iteration and the one or more other iterations for the particular loop, information is stored that indicates which iteration of the particular loop is being executed. Additionally, during execution of at least the particular iteration and the one or more other iterations for the particular loop it is determined if a trace log condition is met for retaining the stored information for the particular loop even after the particular loop has finished execution. Further, during execution of at least the particular iteration and the one or more other iterations for the particular loop, based on determining that the trace log condition is met for at least the particular iteration, information that identifies the particular iteration and indicates which statements of a plurality of statements in the particular loop were executed during the particular iteration are stored in a log that persists even after the particular loop has finished execution. Further still, based on determining that the trace log condition is not met for the one or more other iterations, temporarily stored information about the one or more other iterations without storing the information in the log is discarded. After the particular iteration and the one or more other iterations have been executed, a summary of how the particular loop was executed is stored in the log in association with the particular loop, even though the summary omits how the one or more other iterations were executed.

BRIEF DESCRIPTION OF THE DRAWINGS

FIGS. 3A and 3B illustrate an example of source code and two different resultant trace logs.

DETAILED DESCRIPTION

The present disclosure relates to systems and methods for debugging a program. More particularly, the present disclosure relates to systems and methods for generating a compressed trace log to facilitate the debugging, which can be more simply referred to as a trace log. To generate the trace log, a runtime environment operating on a computing platform executes a given program having a plurality of loops. Each of the plurality of loops includes multiple iterations, and each loop in the given program includes a set of executable statements.

During execution of the program, upon executing a particular iteration of a given loop and one or more other iterations for the given loop, the runtime environment stores information that indicates which iteration of the given loop is being executed. Additionally, the runtime environment determines if a trace log condition is met for retaining the stored information for the given loop even after the given loop has finished execution. The trace log conditions can be embedded in the given program, or can be stored externally from the given program.

During execution of the given iteration of the given loop, the runtime environment determines if one or more of the trace log conditions is met for the given iteration. If one or more of the trace log conditions are met, the runtime environment stores information that identifies the particular iteration and indicates which statements of a plurality of statements in the given loop were executed during the particular iteration in a trace log. The trace log persists after the given loop and has finished executing, and after the program has terminated. Additionally, in situations where the runtime environment determines that none of the trace log conditions are met for one or more other iterations of the given loop, the runtime environment discards temporarily stored information about the one or more other iterations without storing the information in the log to compress the information stored in the trace log.

Additionally, after the loop has been executed, the runtime environment stores a summary of how the given loop was executed in the log with association to the given loop. The summary omits details of how the one or more other iterations were executed. Further, the summary omits statements executed during the one or more other iterations to reduce the size of the trace log. In this manner, the trace log lists a subset of the statements executed for each loop of the given program. Stated differently, the trace log only lists statements executed for selected iterations of each loop, such as a first iteration, a last iteration, or iterations where conditions change from a previous iteration.

Figure 1:
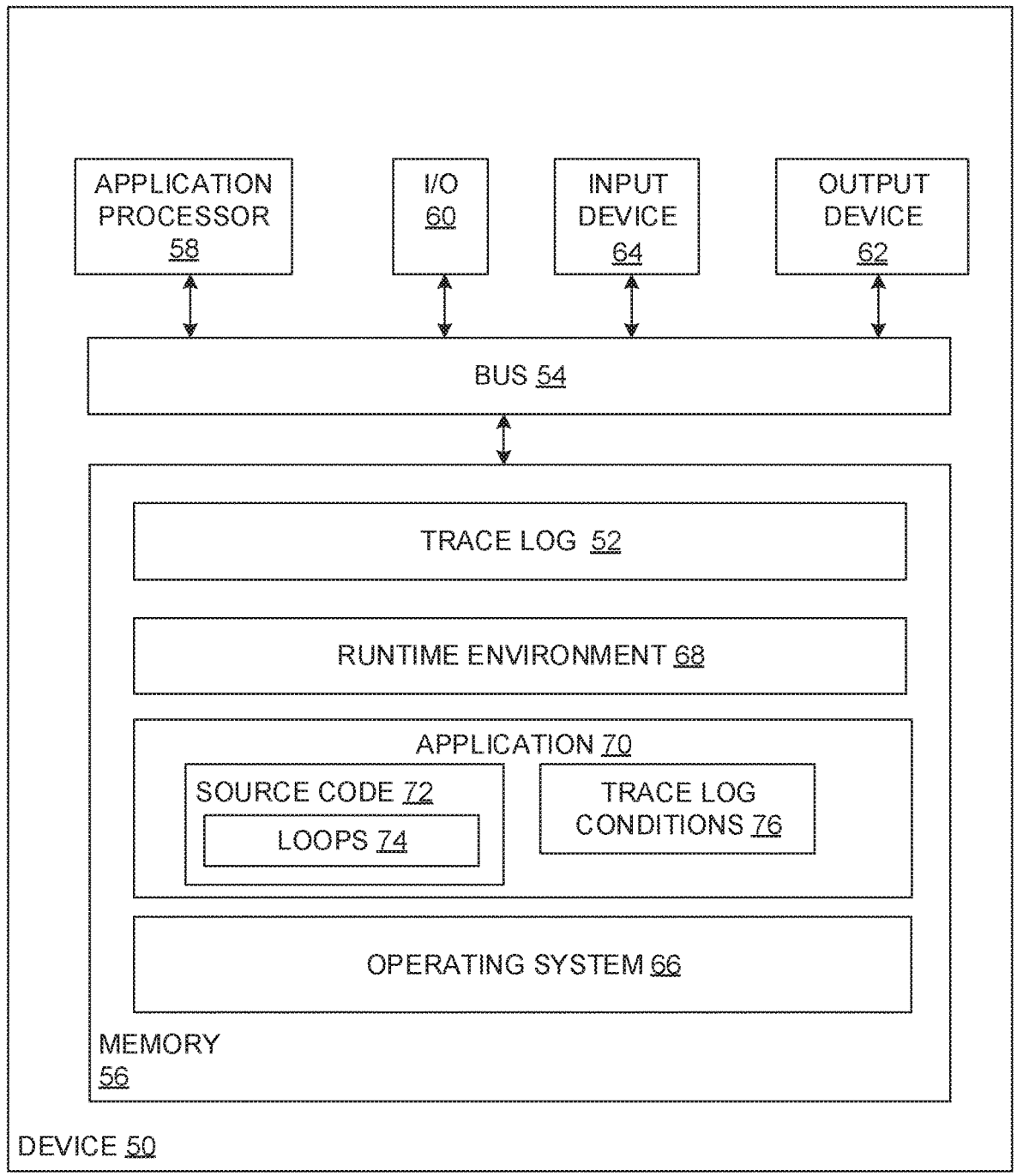
FIG. 1 illustrates an example of a system for generating a trace log to debug an application.

FIG. 1 illustrates a block diagram of a device 50 (e.g., a hardware device) that can be employed to generate a trace log 52 in a compressed format based on the execution of a program (software). The device 50 can deploy a computing platform with multiple execution environments executing in parallel. Moreover, the device 50 can include a bus 54 and/or other communication mechanisms that can communicate information between components of the device 50. The device 50 can also include a memory 56 for storing machine readable instructions and data. The memory 56 can include any one or combination of random access memory ("RAM"), read only memory ("ROM"), static storage such as flash memory, a magnetic or optical disk, or any other type of non-transitory machine or computer-readable medium. The device 50 also includes an application processor 58, operatively coupled to the bus 54, that can process information and execute machine readable instructions or operations.

The application processor 58 may be any type of general or specific purpose processor, such as one or more processor cores. The device 50 further includes an input/output (I/O) port 60, such as a wireless or wired network interface card or other communications interface, to provide access to a network. As some examples, the I/O port 60 can represent any one or more of a Wi-Fi port, a Bluetooth port, a Near Field Communication (NFC) port, a Universal Serial Bus (USB) port, an Ethernet port, a modem, a proprietary communication port and/or any combination thereof. Inclusion of the I/O port 60 allows an external system to interface the device 50 directly or remotely through a network or any other method.

A computer-readable medium may be any available medium that can be accessed by the application processor 58. The computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

The application processor 58 can also be operatively coupled via the bus 54 to an output device 62 and/or an input device 64. In some examples, the output device 62 can be representative of peripherals of a standard computing device, such as a Liquid Crystal Display ("LCD"). In such situations, the input device 64 can be representative of peripherals such as a keyboard and/or a cursor control device (e.g., a mouse or trackpad) can also be operatively coupled to the bus 54 to enable the user to interface with the device 50. Additionally, the combination of the output device 62 and the input device 64 can be representative of a hardware device such as a touch screen.

In some examples, the memory 56 can store software modules that may provide functionality when executed by the application processor 58. The modules can include an operating system 66. The OS 66 can provide an operating system functionality for the device 50 to provide a runtime environment 68 for executing software applications. The runtime environment 68 could be implemented, for example, as a command interpreter, such as PeopleTools by Oracle Corporation. Alternatively, the runtime environment can be implemented as the Java Runtime Environment (JRE) by Oracle Corporation that provides Java Virtual Machine (JVM).

The runtime environment 68 can execute an application 70. The application 70 can be a computer program (sometimes referred to as a "program"). The application 70 includes source code 72 that represents a collection of code in a human-readable programing language. The programming language could be, for example, a general purpose language that can be compiled, such as C++, Java, Swift or Python. Alternatively, the programming language can be an interpreted programming language, such as JavaScript or PeopleCode. The source code 72 can be written in plaintext. The source code 72 includes a plurality of loops 74, such as one or more of any of for-loops, while-loops, do-while loops, repeat until loops or any combination thereof. This list and any other list is intended to disclose both disjunctive and conjunctive embodiments. Each of the plurality of loops 74 has conditions for executing one or more iterations, and each iteration is a candidate iteration to be recorded in the trace log 52 in a manner described herein.

The application 70 can also include trace log conditions 76 that specifies information to be stored in the trace log 52. Such trace log conditions 76 can be configured by a programmer of the source code 72 or other user. The trace log conditions 76 can dictate a level of granularity of information stored in the trace log 52, particularly with respect to the information stored characterizing the execution of the loops 74 of the source code 72. More particularly, the trace log conditions 76 can specify what conditions are needed to retrain stored information for each iteration of a particular loop of the loops 74.

One of the trace log conditions 76 could, for example, specify that statements in a first and/or final iteration of loop in the plurality of loops 74 are recorded in the trace log 52. Additionally or alternatively, another one of the trace log conditions 76 can specify that if a current iteration exits a particular loop prior to completion of the current iteration (e.g., execution of an "exit( )" or "break" statement or equivalent thereof) that the current iteration is recorded in the trace log 52. Additionally or alternatively, one of the trace log conditions 76 can specify that if the number of statements executed the current iteration vary by more than a threshold number (e.g., one or more) than in a previous iteration, that the current iteration is to be recorded in the trace log 52. Stated differently, a trace log condition can specify that if the number of statements in the current iteration vary from a previous iteration by more than the threshold number, the statements for the current iteration are recorded in the trace log 52. Additionally or alternatively, one of the trace log conditions 76 can specify that if different instructions were executed during a current iteration than in a previous iteration, that the current iteration of the loop is to be recorded in the trace log 52.

Further, in some examples, the trace log conditions 76 can specify an output format of a loop summary. In particular, the trace log conditions 76 can specify how a loop counter for each of the loops 74 is recorded in the trace log 52. In particular, the trace log conditions 76 can specify that a standard loop counter for each loop be included in the trace log 52. Additionally or alternatively, the trace log conditions 76 can specify that a total number of nested loops iterations is to be recorded in the trace log 52. Still further, the trace log conditions 76 can specify that in a nested loop, for each iteration of the outer loop, a corresponding number of iterations of an inner loop are recorded in the trace log 52. Still further, the trace log conditions 76 can specify that an early exit of a trace log is recorded as a percentage of an iteration that has been completed or as a fixed value. Further, in some examples, the trace log conditions 76 can specify that every statement executed for the application 70 is recorded in the trace log 52, such that the resultant trace log is provided in an uncompressed format.

Figure 2:
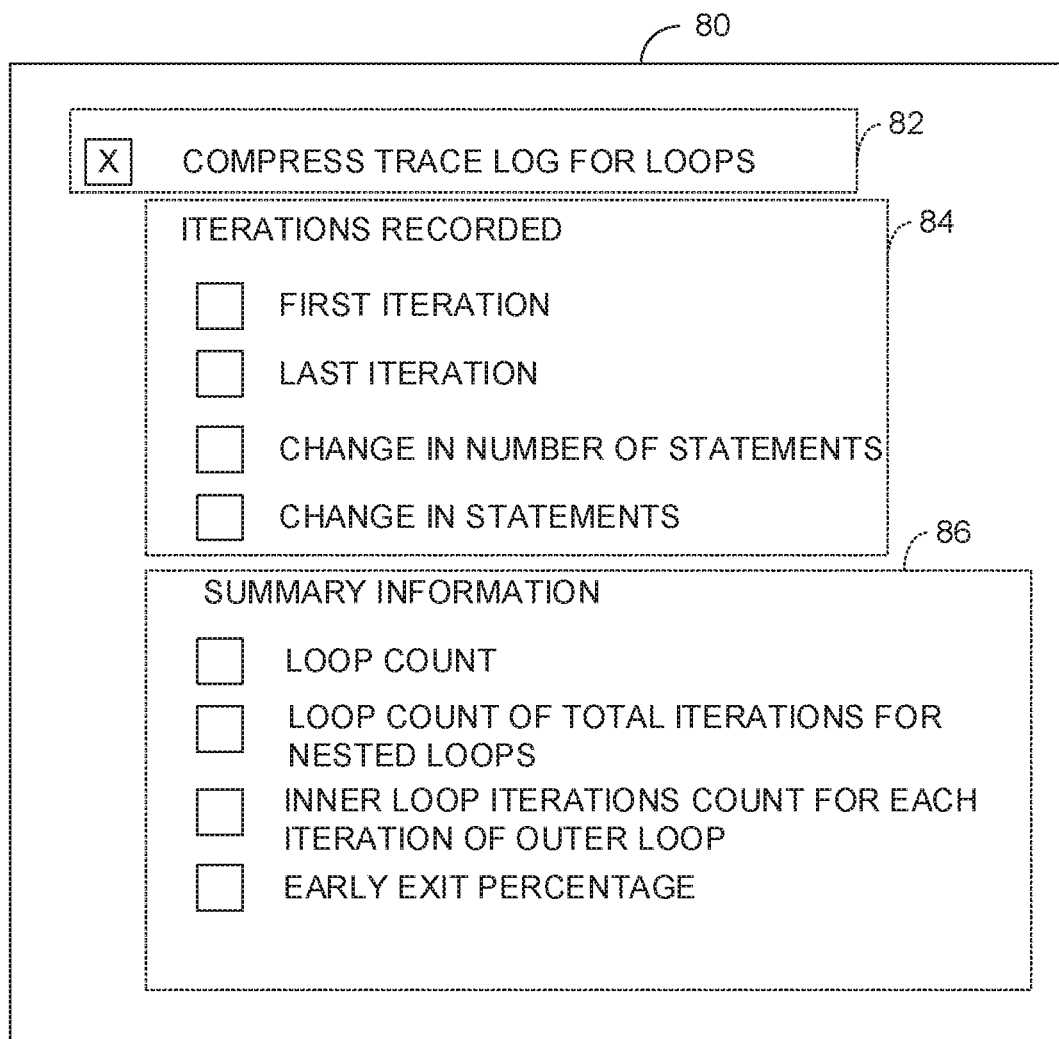
FIG. 2 illustrates an example of a graphical user interface for selecting and/or updating trace log conditions for an application.

FIG. 2 illustrates an example of a graphical user interface (GUI) 80 for setting and/or updating the trace log conditions 76 of FIG. 1. The GUI 80 includes a section 82 with a selection option (e.g., a radio button) for compressing trace logs for the corresponding application (e.g., the application 70 FIG. 1). The GUI 80 also includes a section 84 for selecting which iterations of loops are to be recorded in the trace log. The GUI 80 further includes a section 86 for specifying the output format of a summary of each loop executed. It is understood that the GUI 80 could include more or less options for setting and/or updating the trace log conditions 76.

Referring back to FIG. 1, during execution of the application 70, the runtime environment 68 stores (e.g., in a write operation) information to the trace log 52 characterizing instructions in the source code 72 that are executed by the runtime environment 68. Moreover, the information can be arranged in an order in which the instructions are executed. The trace log 52 persists after termination of the execution of the application 70.

As noted, the source code 72 includes the plurality of loops 74. Conventionally, trace logs record each instruction executed during each iteration of each loop. For complicated applications, such trace logs become unwieldly. The runtime environment 68 is configured to compress the trace log 52 such that a subset instructions are recorded in the trace log 52 during execution of multiple iterations of each of the loops 74 in the source code 72.

More particularly, the runtime environment 68 is configured such that during execution of a particular loop of the plurality loops, the runtime environment 68 temporarily stores information that indicates which iteration of the particular loop is being executed. Such information can include, for example, a numeric value of the number of iterations executed in the particular loop and/or statements executed during a particular iteration of the particular loop.

During execution of each iteration, the runtime environment 68 determines if a trace log condition specified in the trace log conditions 76 is met for retaining the stored information for the particular loop, such that the information is accessible after the particular loop has completed execution. As noted, the trace log condition specified in the trace log conditions 76 could be for example, a condition that a current iteration is a first or a final iteration. Additionally or alternatively, the trace log condition specified in the trace log conditions 76 can be that a current iteration exits the particular loop prior to completion of the current iteration (e.g., execution of an "exit( )" statement, a break statement or equivalent thereof). Additionally or alternatively, the trace log condition specified in the trace log conditions 76 can be condition that a difference number of instructions exceeding a threshold (e.g., one or more) were executed in current iteration than in a previous iteration. Additionally or alternatively, the trace log condition specified in the trace log conditions 76 can be a condition that different instructions were executed during a current iteration than were executed in a previous iteration.

To generate the trace log 52, in situations where the runtime environment 68 determines that the trace log condition has been met for a current iteration, the runtime environment 68 stores information for the current iteration in the trace log 52. Such information can include, but is not limited to an identification of which statements of the particular loop were executed during the current iteration and the order of operations of each statement. Conversely, in situations where the runtime environment 68 determines that the trace log conditions are not met, the runtime environment 68 discards the temporarily stored information about the current iteration of the particular loop being executed, such that this information is not stored in the trace log 52. Stated differently, the trace log 52 is in a compressed format relative to an uncompressed trace log that that records a list of statements for each iteration of each loop 74 in the source code 72.

Upon completing the particular loop of the plurality of loops 74, the runtime environment 68 stores a loop summary consistent with parameters set in the trace log conditions 76. The loop summary explains how the particular loop was executed. Such information can include, for example, a number of times the particular loop was executed (e.g., a loop count). Moreover, the loop summary omits an explanation of how iterations of the particular loop where the temporarily stored information that indicates which iteration of the particular loop is being executed was discarded.

Upon termination of the application 70, the trace log 52 persists in the memory 56. Stated differently, the trace log 52 remains stored in the memory 56 even after the application 70 terminates. In some examples, after termination of the application 70, the trace log 52 is stored in non-volatile memory.

At a subsequent time, the trace log 52 can be accessed by a user. The user can parse the trace log 52 using a text editor or other application to identify bugs and/or inefficiencies in the source code 72. Additionally, since redundant information about certain iterations of the plurality of loops 74 is omitted from the trace log 52, the application 70 can readily debugged since a programmer can quickly review the annotated (and compressed) trace log 52 and identify issues in the code. A further advantage is that the resultant trace log 52 occupies less space of the memory 56.

FIG. 3A illustrates an example of source code 100 that could be representative of a portion of the source code 72 of FIG. 1 and a trace log 110 in an uncompressed format, wherein each statement executed for the source code 100 is recorded in the trace log 110. As is illustrated, for a simple for-loop with only 4 instructions, the trace log 110 records statements executed during each of 10 iterations, and 4 statements for each such iteration. Accordingly, the trace log 110 uses 40 lines of text to represent a relatively simple for-loop, such that the trace log 110 is cumbersome and difficult for an end-user to process.

Figure 3B:
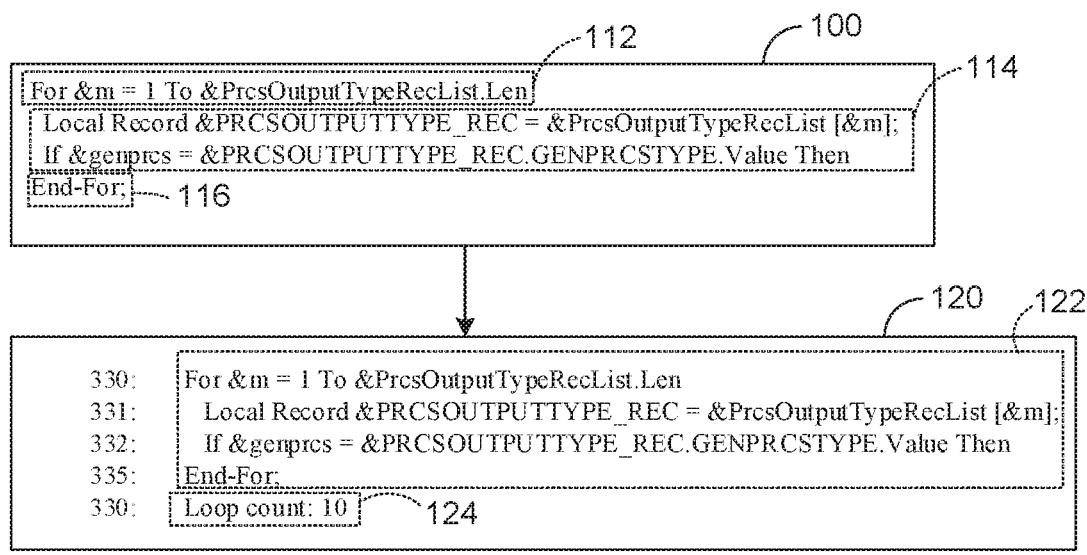

FIG. 3B illustrates an example of the same source code 100 that could be representative of a portion of the source code 72 of FIG. 1 and a resulting trace log 120, wherein the trace log 120 is compressed and records a subset of the statements executed during execution of the for-loop in the source code 100.

The source code 100 includes a header statement 112, a body 114 and a terminating statement 116. During execution of the header statement 112, the runtime environment temporarily stores information characterizing each statement executed in each iteration of the for-loop, including the header 112, the body 114 and the terminating statement 116.

Additionally, during execution of the source code 100, upon executing the header statement 112, the runtime environment (e.g., the runtime environment 68 of FIG. 1) stores information identifying which iteration of the for-loop is being executed. During execution of each iteration of the for-loop, the runtime environment evaluates trace log conditions (e.g., the trace log conditions 76) to determine if a trace log condition for recording detailed information for the current iteration is met. In the example illustrated with respect to FIG. 3B, it is presumed that the trace log conditions specify that a first iteration of each loop be recorded in the trace log 120. Thus, in a situation where the current iteration being executed is a first iteration, each of the statements executed in the first iteration are recorded in the trace log 120. Further, the runtime environment counts the total number of iterations of the for-loop that are executed. Additionally, upon execution of the terminating statement 116 of the source code 100 of a current iteration, if none of the trace log conditions are met, the runtime environment discards the temporarily stored information about the current iteration to reduce the total number of statements in the resultant (compressed) trace log 120.

The trace log 120 includes 2 sections, a first section 122 that lists the statements executed during a (single) particular iteration of the for-loop. In the present example, it is presumed that the particular iteration is the first iteration of the for-loop based on the trace log conditions. Additionally, the trace log 120 includes a second section 124 with information characterizing how the loop was executed. In the present example, the second section 124 includes a loop count that characterizes a number of iterations of the for-loop that were executed.

In comparison to the trace log 110 of FIG. 3A, the trace log 120 of FIG. 3B has significantly fewer lines of information therein. In particular, the trace log 120 includes a list of four (statements) executed during the particular iteration. Thus, a user accessing the trace log 120 can quickly parse the information in the trace log 120 and determine the number of times the for-loop was executed without manually counting the number of statements executed during execution of the for-loop. Additionally, the trace log 120 consumes less memory than the trace log 110 without significantly sacrificing granularity.

Figure 4:
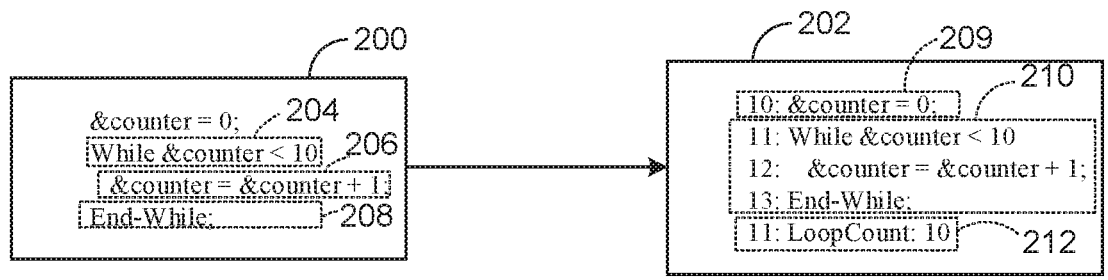
FIG. 4 illustrates another example of source code and a resultant trace log.

FIG. 4 illustrates an example of source code 200 that could be representative of a portion of the source code 72 of FIG. 1 and a resulting trace log 202 in a compressed format wherein a subset of the statements executed for the source code 200 is recorded in the trace log 202. As is illustrated, the source code 200 includes a simple while loop with only 3 instructions. More particularly, the source code 200 includes a header statement 204, a body 206 and a terminating statement 208.

During execution of the source code 200, upon executing the header statement 204, the runtime environment (e.g., the runtime environment 68 of FIG. 1) stores information identifying which iteration of the while loop is being executed. During execution of each iteration of the while loop, the runtime environment evaluates trace log conditions (e.g., the trace log conditions 76) to determine if a trace log condition for recording detailed information for the current iteration is met. In the example illustrated with respect to FIG. 4, it is presumed that the trace log conditions specify that a first iteration of each loop be recorded in the trace log 110. Thus, in a situation where the current iteration being executed is a first iteration, each of the statements executed in the first iteration of the while loop are recorded in the trace log 202. Additionally, upon execution of the terminating statement 208 of a current iteration of the while loop, if none of the trace log conditions are met, the runtime environment discards the temporarily stored information about the current iteration to reduce the total number of statements in the resultant (compressed) trace log 202.

The trace log 202 includes 3 sections, including a first section 209 that includes a statement executed before a loop iteration. The first section 209 includes a statement for initiating a variable employed in the loop. The trace log 202 also includes a second section 210 that lists the statements executed during a (single) particular iteration of the while-loop. In the present example, it is presumed that the particular iteration is the first iteration of the for-loop. Additionally, the trace log 202 includes a third section 212 with summary information characterizing how the loop was executed. In the present example, the third section 212 includes a loop count that characterizes a number of iterations of the while loop that were executed. In the trace log 202, 4 lines of information can summarize 30 lines of executed statements (10 iterations of the while loop) and a variable initiation statement.

Figure 5:
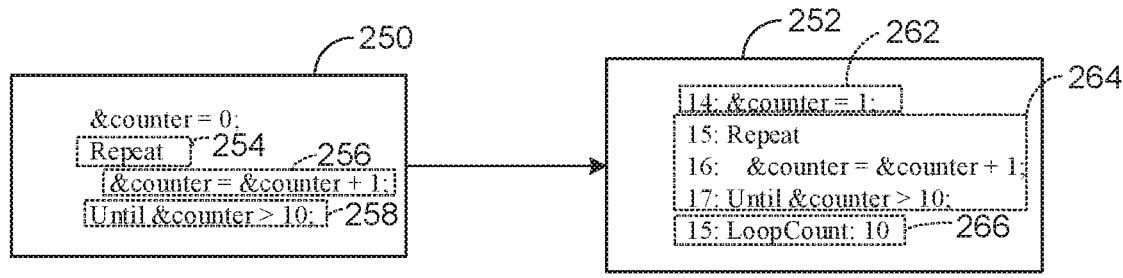
FIG. 5 illustrates another example of source code and a resultant trace log.

FIG. 5 illustrates an example of source code 250 that could be representative of a portion of the source code 72 of FIG. 1 and a resulting trace log 252 in a compressed format wherein a subsets of the statement executed for the source code 250 is recorded in the trace log 252. As is illustrated, the source code 250 includes a simple repeat-until loop with only 3 instructions. More particularly, the source code 250 includes an initial statement 254, a body 256 and a conditional statement 258.

During execution of the source code 250, upon executing the initial statement 254, the runtime environment (e.g., the runtime environment 68 of FIG. 1) stores information identifying which iteration of the repeat until is being executed. During execution of each iteration of the repeat until loop, the runtime environment evaluates trace log conditions (e.g., the trace log conditions 76) to determine if a trace log condition for recording detailed information for the current iteration is met. In the example illustrated with respect to FIG. 5, it is presumed that the trace log conditions specify that a first iteration of each loop be recorded in the trace log 252. Thus, in a situation where the current iteration being executed is a first iteration, each of the statements executed in the first iteration of the while loop are recorded in the trace log 252. Additionally, upon execution of the conditional statement 258 of the source code 250 of a current iteration, if none of the trace log conditions are met, the runtime environment discards the temporarily stored information about the current iteration to reduce the total number of statements in the resultant (compressed) trace log 252.

The trace log 252 includes 3 sections, including a first section 262 that lists statements executed before execution of the repeat until loop. In the present example, the statement in the first section 262 includes a variable initiation statement. The trace log 252 includes a second section 264 that lists the statements executed during a (single) particular iteration of the repeat until. In the present example, it is presumed that the particular iteration is the first iteration of the repeat until loop. Additionally, the trace log 252 includes a third section 266 with information characterizing how the loop was executed. In the present example, the third section 266 includes a loop count that characterizes a number of iterations of the repeat-until loop that were executed. In the trace log 252, 5 lines of information can summarize 30 lines of executed statements (10 iterations of the repeat-until loop) and one variable initiation statement.

Figure 6:
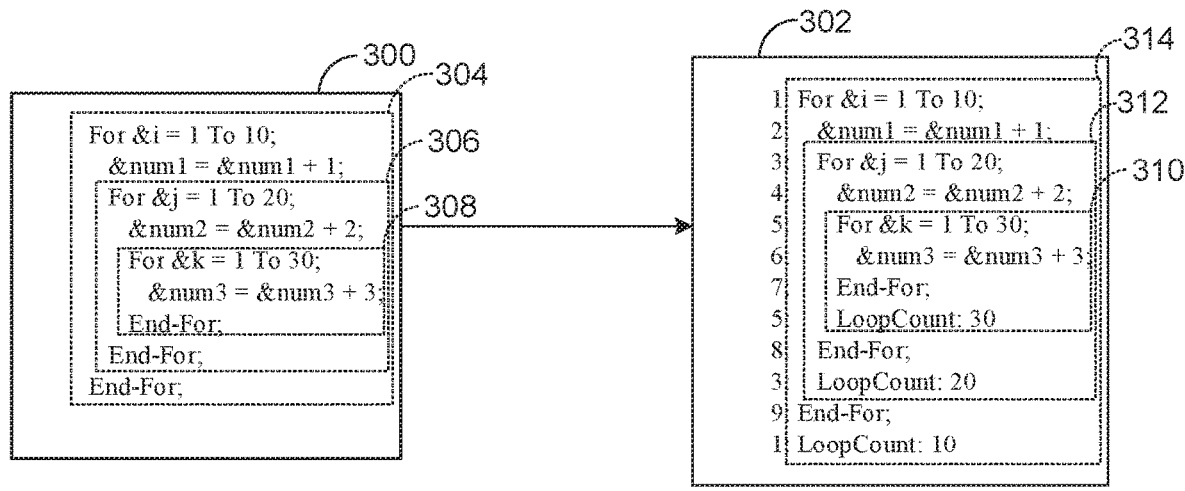
FIG. 6 illustrates yet another example of source code and a resultant trace log.

FIG. 6 illustrates an example of source code 300 that could be representative of a portion of the source code 72 of FIG. 1 and a resulting trace log 302 in a compressed format wherein a subset of the statements executed for the source code 300 is recorded in the trace log 302. As is illustrated, the source code 300 includes 3 nested for loops. More particularly, the source code 300 includes an outer for-loop 304, a middle for-loop 306 and an inner (innermost) for-loop 308. Each of the outer for-loop 304, the middle for-loop 306 and the inner for-loop 308 includes a conditional statement and a terminating statement that are not labeled individually.

During execution of the source code 300, upon executing the conditional statement of the outer for-loop 304, the runtime environment (e.g., the runtime environment 68 of FIG. 1) temporarily stores information identifying which iteration of the outer for-loop 304 is being executed. Additionally, each iteration of the outer for-loop 304 includes 20 iterations of the middle for-loop 306 and each iteration of the middle for-loop 306 includes 30 iterations of the inner for-loop 308. In the example illustrated with respect to FIG. 5, it is presumed that the trace log conditions specify that a first iteration of each loop be recorded in the trace log 302. Thus, in a situation where the current iteration being executed is a first iteration, at least a subset the statements executed in the first iteration for each of the outer for-loop 304, the middle for-loop 306 and the inner for-loop 308 are recorded in the trace log 302. Additionally, upon execution of the terminating statement of the source code 300 of a current iteration of the outer for-loop 304, the middle for-loop 306 and the inner for-loop 308, if none of the trace log conditions are met, the runtime environment discards the temporarily stored information about the current iteration to reduce the total number of statements in the resultant (compressed) trace log 302.

The trace log 302 includes 3 sections, including a first section 310 that includes a set of statements executed for a first iteration of the inner for-loop 308 as well as a loop counter for the inner for-loop 308. The first section 310 is similar to the first and second section 122 and 124 described with respect to FIG. 3B. Additionally, the trace log 302 includes a second section 312 that includes the first section 310 and a subset of statements executed for the first iteration of the middle for-loop 306 along with a loop counter for the middle for-loop 306. In particular, the runtime environment records a single instance of statements executed in the inner for-loop 308 (and not statements for multiple iterations). Similarly, the trace log 302 includes a third section 314 that includes the second section 312 and the first section 310, a subset of statements executed in the first iteration of the outer for-loop 304 along with a loop counter for the outer for-loop 304. Similar to the information in the second section, the runtime environment records a single instance of statements executed in the middle for-loop 306 (and not statements for multiple iterations). In the trace log 302, 12 lines of information summarizes 6000 iterations of the for-loops.

Figure 7:
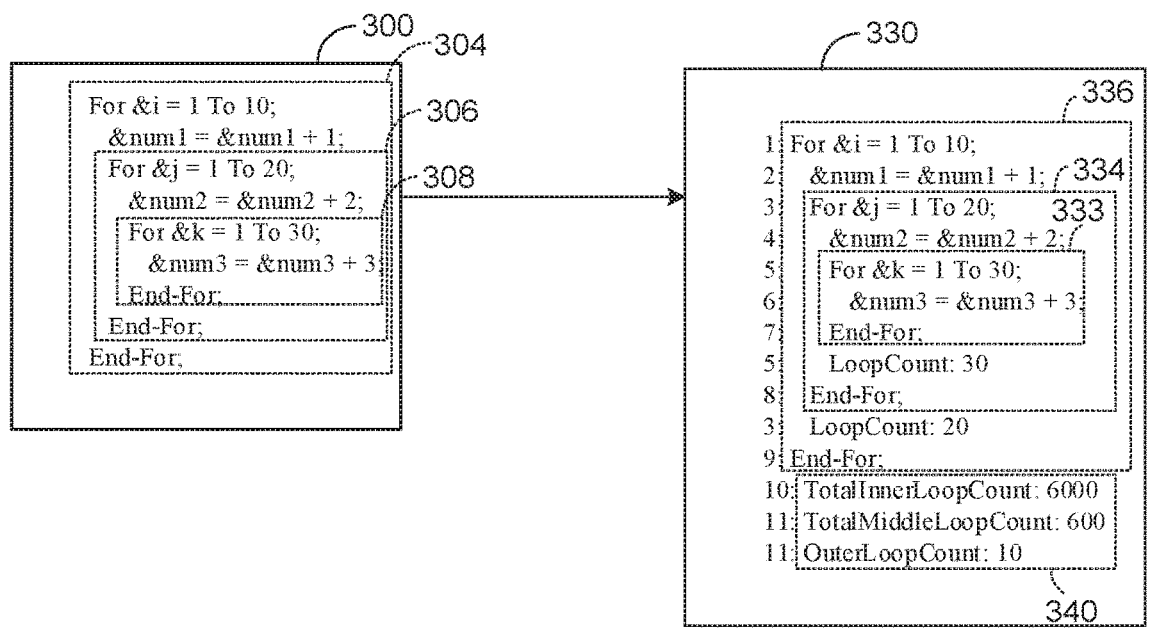
FIG. 7 illustrates still yet another example of source code and a resultant trace log.

FIG. 7 illustrates an example of the source code 300 illustrated in FIG. 6, wherein the runtime environment is configured to organize a resultant trace log 330 in a different manner than that of the trace log 302. In the example illustrated in FIG. 7, it is presumed that the trace log conditions specify that a total number of iterations of each executed loop be recorded. In particular, the trace log 330 includes 4 sections, including a first section 333 that lists the statements executed for one iteration of the inner for-loop 308. The trace log 330 also includes a second section 334 that lists a subset of statements executed for one iteration of the middle for-loop 306 and includes the first section 333. The trace log 330 further includes a third section 336 that lists a subset of statements executed for one iteration of the outer for-loop 304 as well as the second section 334 and the first section 333.

Further, the trace log 330 includes a fourth section 340 that includes a loop count for each of the inner for-loop 308, the middle for-loop 306 and the outer for-loop 304. As compared to the trace log 302 illustrated in FIG. 6, the trace log 330 provides information characterizing a total number of times each of the outer for-loop 304, the middle for-loop 306 and the inner for-loop 308 was executed.

Figure 8:
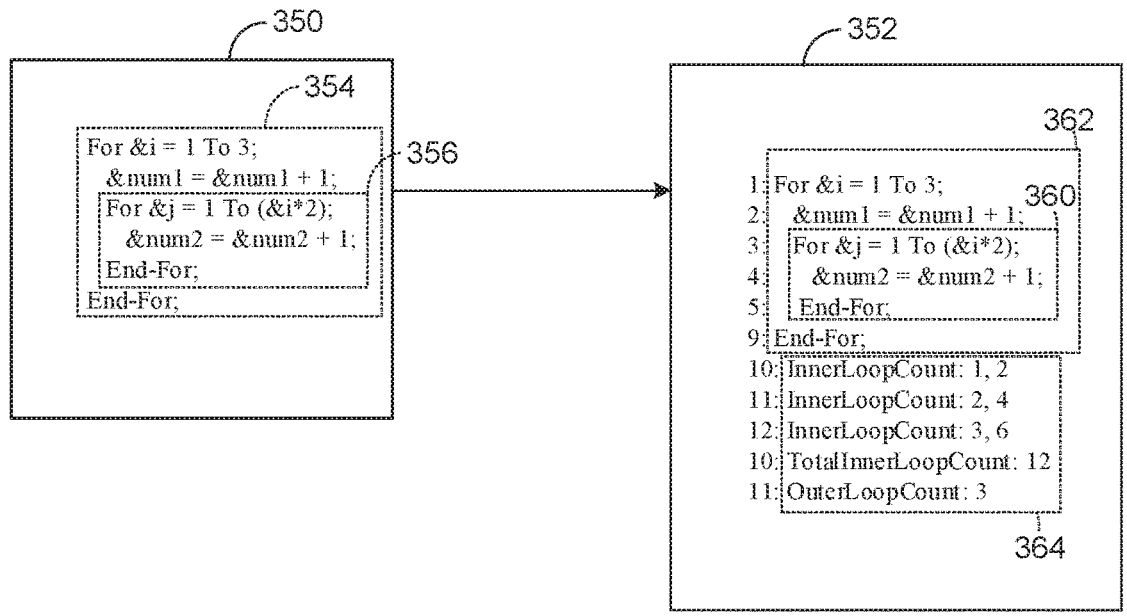
FIG. 8 illustrates further still yet another example of source code and a resultant trace log.

FIG. 8 illustrates an example of source code 350 that could be representative of a portion of the source code 72 of FIG. 1 and a resulting trace log 352 in a compressed format wherein a subset of the statements executed for the source code 350 is recorded in the trace log 352. As is illustrated, the source code 350 includes 1 nested for loop. More particularly, the source code 350 includes an outer for-loop 354, and an inner for-loop 356. Each of the outer for-loop 354 and the inner for-loop 356 includes a conditional statement and a terminating statement that are not labeled individually.

During execution of the source code 350, upon executing the conditional statement of the outer for-loop 354, the runtime environment (e.g., the runtime environment 68 of FIG. 1) temporarily stores information identifying which iteration of the outer for-loop 354 is being executed. Additionally, each iteration of the outer for-loop 354 includes 3 iterations of the inner for-loop 356. In the example illustrated with respect to FIG. 8, it is presumed that the trace log conditions specify that a final iteration of each loop be recorded in the trace log 352 and that a total number of inner nested loop iterations be tracked for each execution of an iteration of an outer for-loop. Thus, in a situation where the current iteration being executed is a final iteration, each of the statements executed in the final iteration of the while loop are recorded in the trace log 352. Additionally, upon execution of the terminating statement of the source code of a current iteration of the outer for-loop 354 and the inner for-loop 356, if none of the trace log conditions are met, the runtime environment discards the temporarily stored information about the current iteration to reduce the total number of statements in the resultant (compressed) trace log 352.

The trace log 352 includes 4 sections, including a first section 360 that includes a subset of statements executed for a final iteration of the inner for-loop 308 as well as a loop counter for the inner for-loop 308. The first section 360 is similar to the first and second sections 122 and 124 described with respect to FIG. 3B. Additionally, the trace log 352 includes a second section 362 that includes the first section 360 and a subset of statements executed for a final iteration of the middle for-loop 306 along with a loop counter for the inner for-loop 356. In particular, the runtime environment records a single instance of statements executed in the inner for-loop 356 (and not statements for multiple iterations).

Additionally, in the example illustrated in FIG. 8, it is presumed that the trace log conditions specify that a total number of iterations of executed nested loops be recorded during each iteration of an outer for-loop as well a as total number of iterations executed for each loop. Thus, the trace log 352 includes a third section 364 that includes a loop count for 356 the inner for-loop 356 that identifies a total number of times the outer for-loop 354 and the inner for-loop 356 were executed. Additionally, the trace log 352 includes multiple instance of an inner for-loop count that is implemented as an indexed number labeled, "InnerLoopCount". Each instance of the inner for-loop count characterizes the number of time the inner for-loop is executed in a corresponding iteration of the outer for-loop 354. As an example, the third section 364 of the trace log 352 includes a number "InnerLoopCount: 3,6" which indicates that on loop iteration 3 of the outer for-loop 354, the inner for-loop 356 had 6 iterations.

Thus, compared to the trace logs 302 and 330 of FIGS. 5 and 6, respectively, the trace log 352 of FIG. 8 includes additional lines of information. However, the additional lines of information (the inner for-loop counts) identify more detail about how the inner for-loop 356 was executed.

Figure 9:
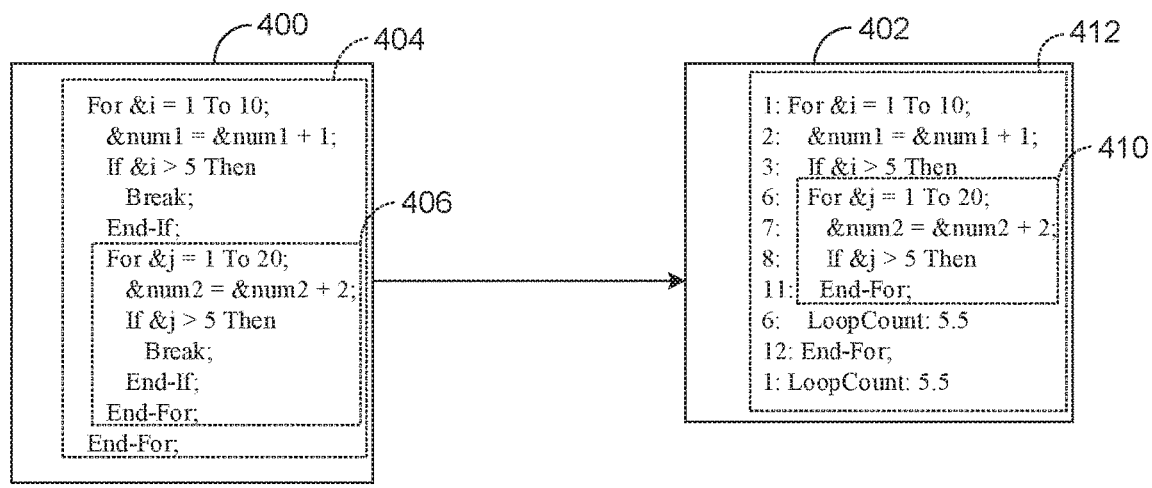
FIG. 9 illustrates still another example of source code and a resultant trace log.

FIG. 9 illustrates an example of source code 400 that could be representative of a portion of the source code 72 of FIG. 1 and a resulting trace log 402 in a compressed format wherein a subset of the statements executed for the source code 400 is recorded in the trace log 402. As is illustrated, the source code 400 includes 1 nested for loop. More particularly, the source code 400 includes an outer for-loop 404, and an inner for-loop 406. Each of the outer for-loop 404 and the inner for-loop 406 includes a conditional statement and a terminating statement that are not labeled individually.

During execution of the source code 400, upon executing the conditional statement of the outer for-loop 404 or the inner for-loop 406, the runtime environment (e.g., the runtime environment 68 of FIG. 1) temporarily stores information identifying which iteration of the outer for-loop 404 or the inner for-loop 406 is being executed. Additionally, each iteration of the outer for-loop 404 and the inner for-loop includes a break statement ("Break" in FIG. 8) that, if executed, causes an early termination of the loop.

In the example illustrated in FIG. 9, it is presumed that the trace log conditions specify that a first iteration of each loop be recorded in the trace log 402. Thus, in a situation where the current iteration being executed is a first iteration, each of the statements executed in the first iteration of the outer for-loop 404 and the inner for-loop 406 are recorded in the trace log 402. Additionally, upon execution of the terminating statement of the source code of a current iteration of the outer for-loop 404 and the inner for-loop 406, if none of the trace log conditions are met, the runtime environment discards the temporarily stored information about the current iteration to reduce the total number of statements in the resultant (compressed) trace log 402. Further, upon execution of a break statement, for either the outer for-loop 404 or the inner for-loop 406, the runtime environment records a non-integer value for total number of loop iterations in the trace log 402.

The trace log 402 includes 3 sections, including a first section 410 that includes a of statements executed for a first iteration of the inner for-loop 406 as well as a loop counter for the inner for-loop 406. Similarly, the trace log 402 includes a second section 412 that includes and the first section 410 along with a loop counter for the outer for-loop 404. Similar to the information in the second section, the runtime environment records a single instance of statements executed in the inner for-loop 406 (and not statements for multiple iterations).

The trace log 402 provides information characterizing a total number of times each of the outer for-loop 404 and the inner for-loop 406 were executed. As noted, the trace log 402 includes a loop counter for the inner for-loop 406. In the present example, each loop counter has a non-integer value. The non-integer value (5.5) indicates that a last iteration of a corresponding loop exited base on conditions other than the conditions specified in the conditional statement of the loop. Thus, a value of 5.5 indicates that the loop exited early in the sixth iteration of the corresponding loop. In the trace log 402, each of the inner for-loop 406 and the outer for-loop 404 are exited prior to completion of a last iteration of the corresponding loop. Thus, the loop counter for the inner for-loop 406 and the loop counter for the outer for-loop 404 have a non-integer value.

Figure 10:
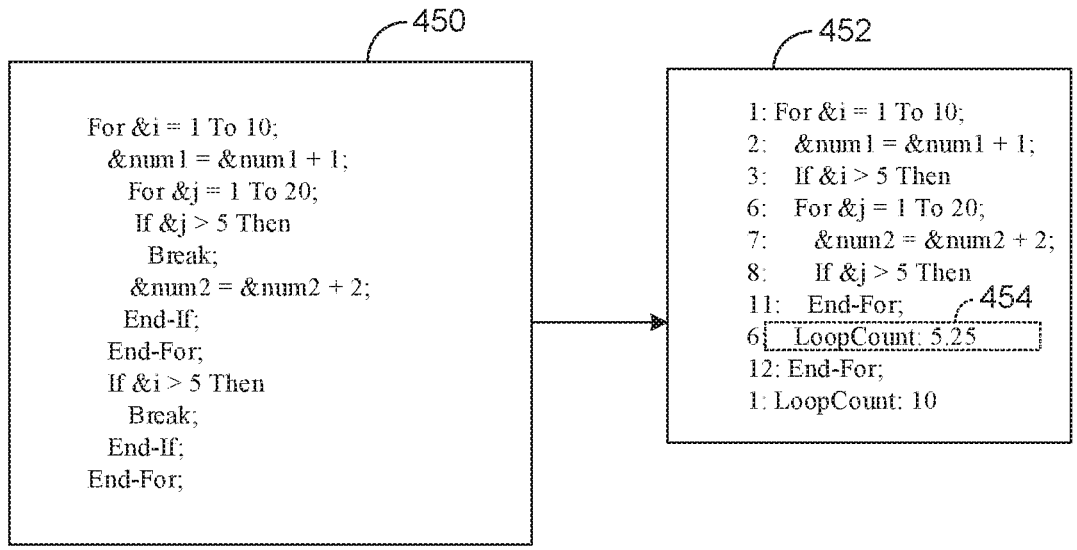
FIG. 10 illustrates another example of source code and a resultant trace log.

FIG. 10 illustrates an example of source code 450 that could be representative of a portion of the source code 72 of FIG. 1 and a resulting trace log 452 in a compressed format wherein a subset of the statements executed for the source code 400 is recorded in the trace log 402. The source code 450 and the trace log 452 is similar to the trace log 452 of FIG. 9, such that the details are not repeated for purposes of simplification of explanation. Additionally, in contrast to the trace log 402 of FIG. 9, in the trace log 452, each loop counter has a non-integer value which varies based on a percentage of a last iteration of a corresponding loop that was executed. For example, the trace log 452 includes a value for "LoopCount: 5.25" 454, indicating that about 25% of the sixth iteration of an inner for-loop was executed during when the loop executed a break statement.

Figure 11:
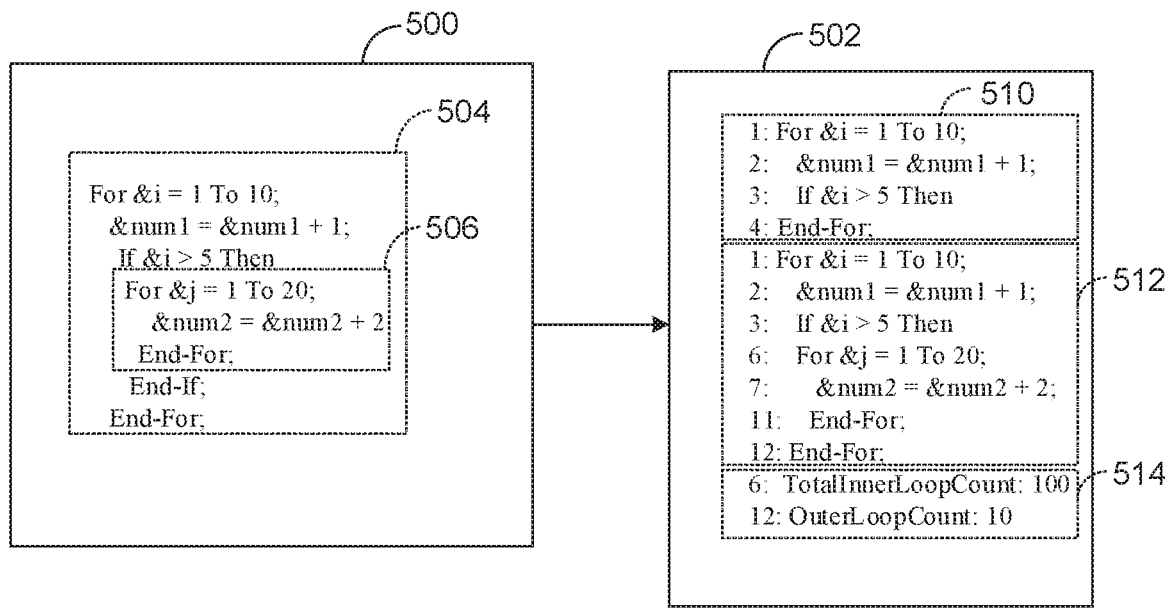
FIG. 11 illustrates yet another example of source code and a resultant trace log.

FIG. 11 illustrates an example of source code 500 that could be representative of a portion of the source code 72 of FIG. 1 and a resulting trace log 502 in a compressed format wherein a subset of the statements executed for the source code 500 is recorded in the trace log 502. As is illustrated, the source code 500 includes 2 nested for-loops. More particularly, the source code 500 includes an outer for-loop 504, and an inner for-loop 506. Each of the outer for-loop 504 and the inner for-loop 506 includes a conditional statement and a terminating statement that are not labeled individually.

During execution of the source code 500, upon executing the conditional statement of the outer for-loop 504, the runtime environment (e.g., the runtime environment 68 of FIG. 1) temporarily stores information identifying which iteration of the outer for-loop 304 is being executed. Additionally, each of the fifth through tenth iterations of the outer for-loop 504 includes 20 iterations of the inner for-loop 506. In the example illustrated with respect to FIG. 5, it is presumed that the trace log conditions specify that a first iteration of each loop be recorded in the trace log 502 and that a change in a number of instructions executed in a previous iteration be recorded in the trace log 502. Thus, in a situation where the current iteration being executed is a first iteration, at least a subset of statements executed in the first iteration of the outer for-loop 504 are recorded in the trace log 502. Further, during the fifth iteration of the outer for-loop 504, the runtime environment determines that a number of statements executed in the fifth iteration have changed from a previous iteration (a fourth iteration) since the inner for-loop 506 is executed. Thus, statements executed during the fifth iteration of the outer for-loop 504 are executed. Additionally, statements executed in the first iteration of the inner for-loop 506 are recorded in the trace log 502. Additionally, upon execution of the terminating statement of the source code 500 of a current iteration of the outer for-loop 504, the inner for-loop 506, if none of the trace log conditions are met, the runtime environment discards the temporarily stored information about the current iteration to reduce the total number of statements in the resultant (compressed) trace log 502.

The trace log 502 includes 3 sections, including a first section 510 that includes statements executed for a first iteration of the outer for-loop 504. Additionally, the trace log 502 includes a second section 512 that includes a subset statements executed during a subsequent iteration of the outer for-loop 504, wherein the inner for-loop 506 was executed. That is, the trace log 502 includes the second section 512 since there was a change in the number of statements executed during the first iteration (recorded in the first section 510 of trace log 502) by a threshold amount. Further, the trace log 502 includes a third section 514 that includes information characterizing a total number of times the inner for-loop 506 was executed and a number of times the outer for-loop 504 was executed.

Figure 12:
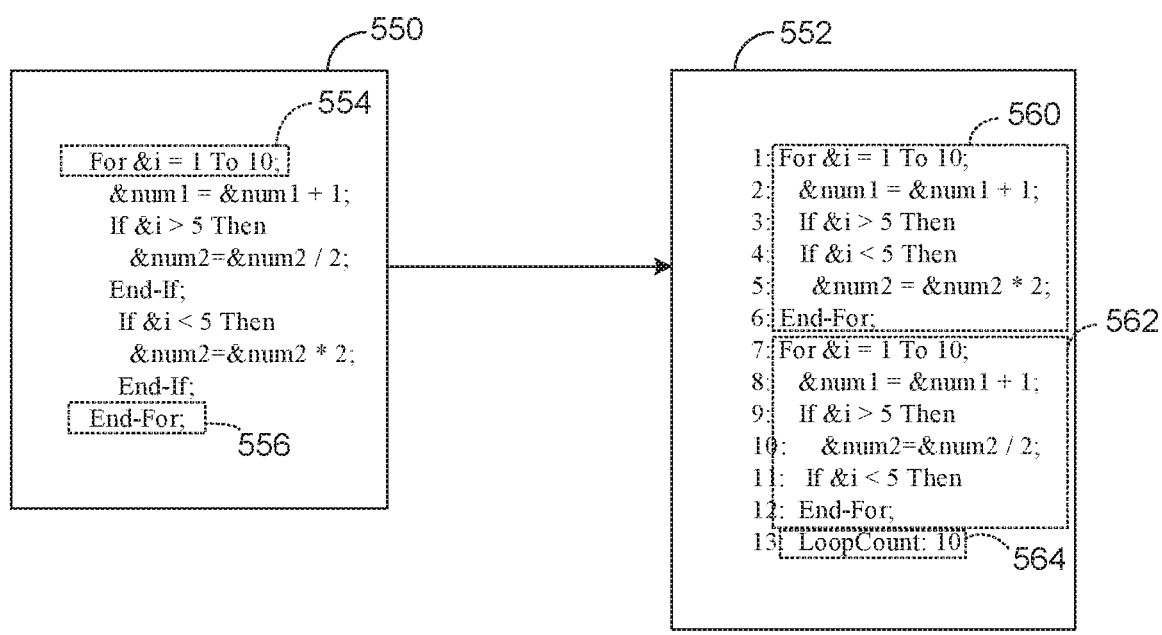
FIG. 12 illustrates yet another example of source code and a resultant trace log.

FIG. 12 illustrates an example of source code 550 that could be representative of a portion of the source code 72 of FIG. 1 and a resulting trace log 552 in a compressed format wherein a subset of the statements executed for the source code 550 is recorded in the trace log 552. As is illustrated, the source code 550 includes 2 nested for-loops. More particularly, the source code 550 includes one for-loop. The inner for-loop includes a conditional statement 554 and a terminating statement 556.

During execution of the source code 550, upon executing the conditional statement 554, the runtime environment (e.g., the runtime environment 68 of FIG. 1) temporarily stores information identifying which iteration of the for-loop is being executed. In the example illustrated with respect to FIG. 5, it is presumed that the trace log conditions specify that a first iteration of each loop be recorded in the trace log 502 and that a change in the instructions executed in a previous iteration be recorded in the trace log 552. Thus, in a situation where the current iteration being executed is a first iteration, each of the statements executed in the first iteration of the for-loop are recorded in the trace log 552. Further, during the fifth iteration of the for-loop, the runtime environment determines that the statements executed in the fifth iteration have changed from a previous iteration (a fourth iteration) since the for-loop is executed. Thus, statements executed during the fifth iteration of the for-loop are executed. Additionally, statements executed in the fifth iteration of the inner for-loop are recorded in the trace log 552. Additionally, upon execution of the terminating statement 556 of the source code 550 of a current iteration of the for-loop if none of the trace log conditions are met, the runtime environment discards the temporarily stored information about the current iteration to reduce the total number of statements in the resultant (compressed) trace log 552.

The trace log 552 includes 3 sections, including a first section 560 that includes statements executed for a first iteration of the outer for-loop in the source code 550. Additionally, the trace log 552 includes a second section 562 that includes statements executed during a subsequent iteration of the for-loop in the source code 550. That is, the trace log 552 includes the second section 562 since there was a change in the statements executed during a prior iteration of the for-loop (recorded in the first section 560 of the trace log 552). Further, the trace log 552 includes a third section 564 that includes information characterizing a total number of time the for-loop of the source code 500 was executed.

Figure 13:
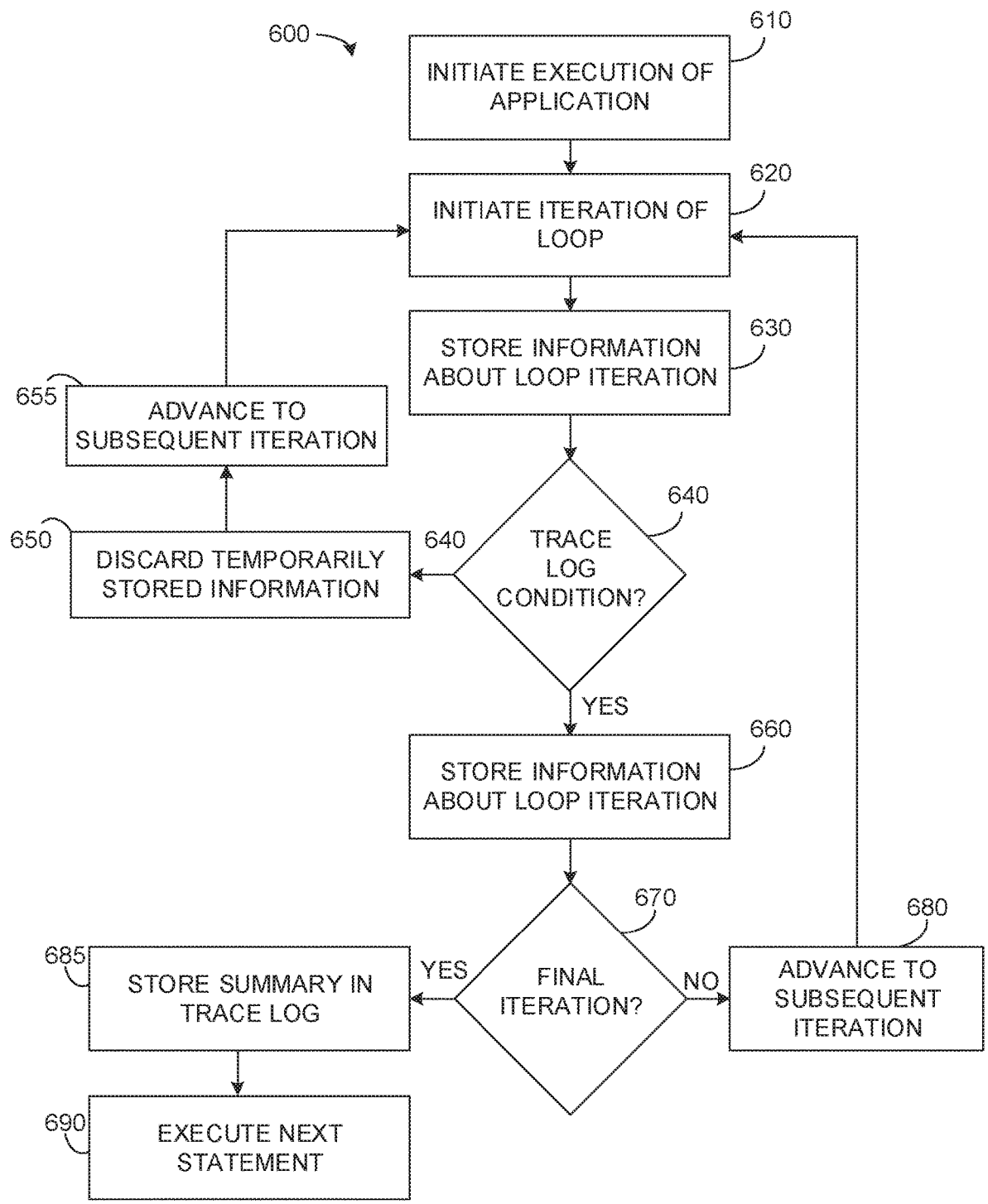
FIG. 13 illustrates a flowchart of an example method for generating a trace log for debugging a program.

In view of the foregoing structural and functional features described above, an example method will be better appreciated with reference to FIG. 13. While, for purposes of simplicity of explanation, the example method of FIG. 13 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 13 illustrates a flowchart of an example method 600 for generating a trace log to debug a program. The method 600 can be implemented, for example, by the device 50 of FIG. 1. At 610, a runtime environment (e.g., the runtime environment 68 of FIG. 1) initiates executes an application (e.g., the application 70 of FIG. 1). The application includes source code with a plurality of loops.

At 620, during execution of the application, the runtime environment initiates a given iteration of a loop. At 630, the runtime environment temporarily stores information that indicates which iteration of the loop is being executed. At 640, a determination is made as to whether a trace log condition (e.g., included in the application) is met for retaining the stored information in the trace log that persists after the loop has completed execution. If the determination at 640 is negative (e.g., NO), the method 600 proceeds to 650. If the determination at 640 is positive (e.g., YES), the method 600 proceeds to 650. At 650, temporarily stored information about the given iteration being executed (e.g., a list of statements in the iteration of the loop) can be discarded. At 655, the loop advances to a subsequent iteration, and the method 600 returns to 620.

At 660, information about the iteration being executed is stored in the trace log. The information can include, but is not limited to the statements executed during the given iteration of the loop. At 670, a determination is made as to whether the given iteration is a final iteration of the loop. If the determination at 670 is negative (e.g., NO), the method 600 proceeds to 680. If the determination at 670 is positive (e.g., YES), the method 600 proceeds to 685. At 680, the loop advances to a subsequent iteration, and the method 600 returns to 620. At 685, a summary of how the loop was executed can be stored in the trace log. At 690, a next statement (after the loop) of the application is executed.

Figure 14:
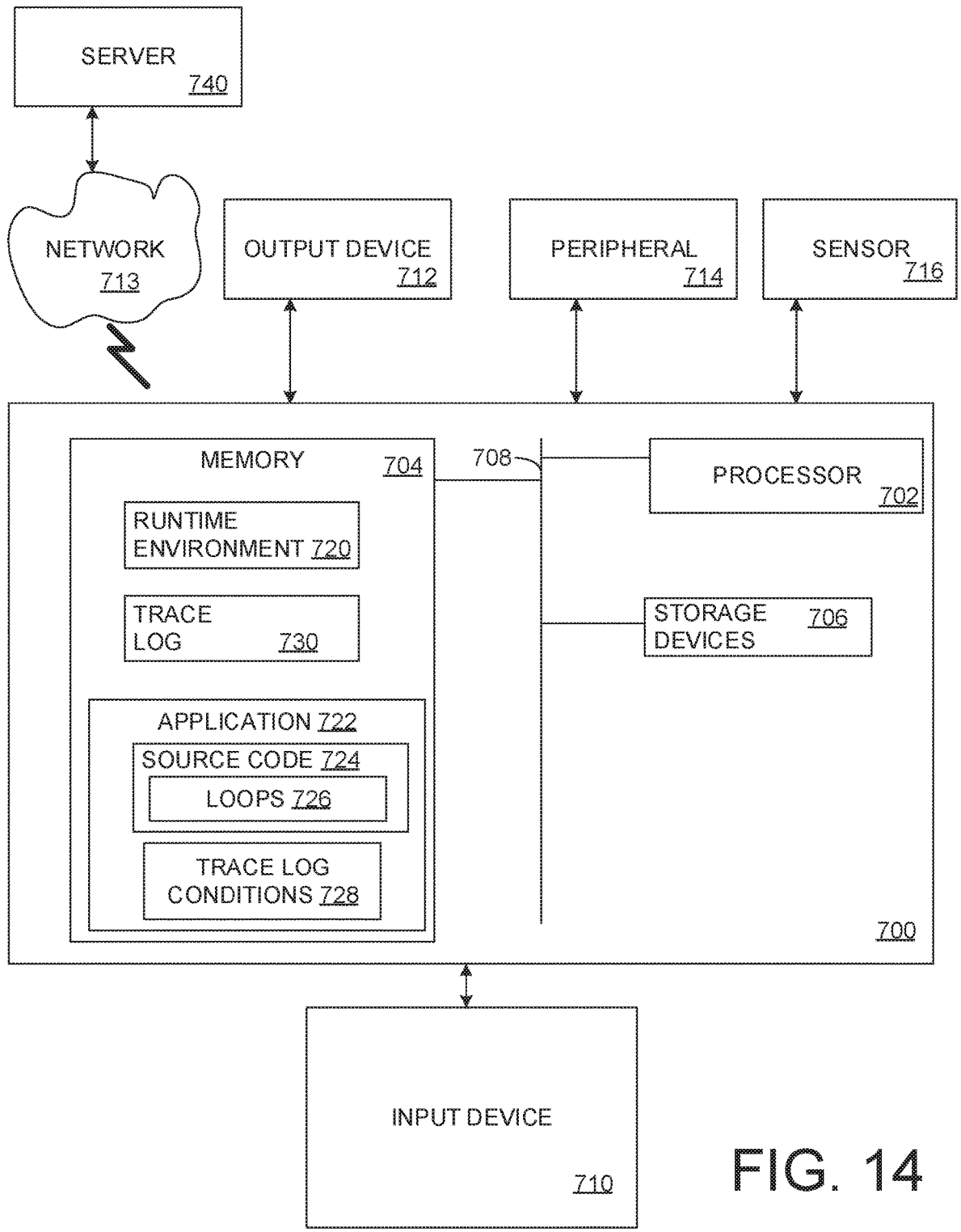
FIG. 14 illustrates an example of a computing system employable to generate a trace log.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. As shown in FIG. 14, the computing system 700 can include a computer processor 702, associated memory 704 (e.g., random access memory (RAM), cache memory, flash memory, etc.), one or more storage devices 706 (e.g., a solid state drive, a hard disk drive, an optical drive such as a compact disk (CD) drive or digital versatile disk (DVD) drive, a flash memory stick, etc.), and numerous other elements and functionalities. The computer processor 702 may be an integrated circuit for processing instructions. For example, the computer processor may be one or more cores, or micro-cores of a processor. Components of the computing system 700 can communicate over a data bus 708.

The computing system 700 may also include an input device 710, such as any combination of one or more of a touchscreen, keyboard, mouse, microphone, touchpad, electronic pen, or any other input device. Further, the computing system 700 can include an output device 712, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 712 can be the same physical device as the input device 710. In other examples, the output device 712 and the input device 710 can be implemented as separate physical devices. The computing system 700 can be connected to a network 713 (e.g., a local area network (LAN), a wide area network (WAN) such as the Internet, mobile network, or any other type of network) via a network interface connection (not shown). The input device and output device(s) can be connected locally and/or remotely (e.g., via the network 713) connected to the computer processor 702, the memory 704, and/or the storage device 706. Many different types of computing systems exist, and the aforementioned input device 710 and the output device 712 can take other forms. The computing system 700 can further include a peripheral 714 and a sensor 716 for interacting with the environment of the computing system 700 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein.

The memory 704 can include an runtime environment 720 that can execute an application 722 (e.g., a program). The runtime environment 720 could be implemented, for example, as a command interpreter, such as PeopleTools by Oracle Corporation. Alternatively, the runtime environment can be implemented as the Java Runtime Environment (JRE) by Oracle Corporation that provides Java Virtual Machine (JVM). The application 722 can include source code 724 with a list of statements for the computing system 700 to execute during execution of the application 722. The source code 722 includes a plurality of loops 726. The application 722 can include trace log conditions 728 that specify what statements in the source code 724 are to be recorded in a trace log 730 that persists after termination of the application 722 in a manner described herein.

The computing system 700 can communicate with a server 740 via the network 713. In some examples, the application 722 can be provided from the server 740. Additionally or alternatively, the server 740 can provide the runtime environment 720 for executing the application 722.

Further, one or more elements of the aforementioned computing system 700 can be located at a remote location and connected to the other elements over the network 713. Further, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for debugging a program, the method comprising:
   executing, by a computing platform, a given program comprising a plurality of loops, each of the plurality of loops comprising multiple candidate iterations, wherein each loop in the given program includes a set of executable statements;
   wherein a particular loop of the plurality of loops comprises at least a particular iteration and one or more other iterations;
   executing at least the particular iteration and the one or more other iterations for the particular loop, and during execution of at least the particular iteration and the one or more other iterations for the particular loop:
   storing information that indicates which iteration of the particular loop is being executed;
   determining if a trace log condition is met for retaining the stored information for the particular loop even after the particular loop has finished execution;
   wherein, based on determining that the trace log condition is met for at least the particular iteration, storing, in a log that persists even after the particular loop has finished execution, information that identifies the particular iteration and indicates which statements of a plurality of statements in the particular loop were executed during the particular iteration; and
   wherein, based on determining that the trace log condition is not met for the one or more other iterations, discarding temporarily stored information about the one or more other iterations without storing the information in the log; and
   after the particular iteration and the one or more other iterations have been executed, storing the log in association with the particular loop, as a summary of how the particular loop was executed, even though the summary omits how the one or more other iterations were executed.

2. The method of claim 1, wherein the summary includes a loop counter identifying how many iteration of the particular loop was executed.

3. The method of claim 2, wherein the particular loop includes a statement for exiting the particular loop prior to completion of a final iteration of the particular loop and the summary includes indicia indicating that the particular loop was exited prior to completion of a final iteration of the particular loop.

4. The method of claim 3, wherein the loop counter has a non-integer value.

5. The method of claim 3, wherein the loop counter has a non-integer value corresponding to a percentage of the particular loop that was executed during the final iteration.

6. The method of claim 2, wherein the particular loop is an outer loop that includes an inner loop comprising a particular iteration and at least one or more other iterations of the inner loop, the method further comprising:
   executing the particular iteration of the inner loop, and during execution of at least the particular iteration of the inner loop and the one or more other iterations for the particular loop:
   storing information that indicates which iteration of the inner loop is being executed;
   determining if a trace log condition is met for retaining the stored information for the particular iteration of the inner loop even after the inner loop has finished execution;
   wherein, based on determining that the trace log condition is met for at least the particular iteration of the inner loop, storing, in the log, information that identifies the particular iteration of the inner loop and indicates which statements of a plurality of statements in the inner loop were executed during the particular iteration of the inner loop;
   wherein, based on determining that the trace log condition is not met for the one or more other iterations, discarding temporarily stored information about the one or more other iterations of the inner loop without storing the information in the log; and
   storing, in the log in association with the particular loop, as a summary of how the inner loop was executed, even though the summary omits how the one or more other iterations of the inner loop were executed, wherein the summary includes a loop counter for the inner loop with information that identifies a total number of times the inner loop was executed during the execution of the outer loop.

7. The method of claim 6, wherein the summary further includes information specifying how many times the inner loop was executed during each iteration of the outer loop.

8. The method of claim 1, wherein the trace log condition specifies that a current iteration has a difference in a number of statements greater than or equal to a threshold than a previous iteration.

9. The method of claim 1, wherein the trace log condition specifies that a current iteration has at least one different statement than a previous iteration.

10. A non-transitory computer-readable storage medium storing program instructions that when executed by a computing platform operating on a device cause the computing platform to perform operations comprising:

executing, by the computing platform, a given program comprising a plurality of loops, each of the plurality of loops comprising multiple candidate iterations, wherein each loop in the given program includes a set of executable statements; and wherein a particular loop of the plurality of loops comprises at least a particular iteration and one or more other iterations;

executing at least the particular iteration and the one or more other iterations for the particular loop, and during execution of at least the particular iteration and the one or more other iterations for the particular loop:

storing information that indicates which iteration of the particular loop is being executed;

determining if a trace log condition is met for retaining the stored information for the particular loop even after the particular loop has finished execution;

wherein, based on determining that the trace log condition is met for at least the particular iteration, storing, in a log that persists even after the particular loop has finished execution, information that identifies the particular iteration and indicates which statements of a plurality of statements in the particular loop were executed during the particular iteration; and wherein, based on determining that the trace log condition is not met for the one or more other iterations, discarding temporarily stored information about the one or more other iterations without storing the information in the log; and after the particular iteration and the one or more other iterations have been executed, storing the log in association with the particular loop, as a summary of how the particular loop was executed, even though the summary omits how the one or more other iterations were executed.

11. The medium of claim 10, wherein the summary includes a loop counter identifying how many iteration of the particular loop was executed.

12. The medium of claim 11, wherein the particular loop includes a statement for exiting the particular loop prior to completion of a final iteration of the particular loop and the summary includes an indicia indicating that the particular loop was exited prior to completion of a final iteration of the particular loop.

13. The medium of claim 11, wherein the loop counter has a non-integer value.

14. The medium of claim 11, wherein the loop counter has a non-integer value corresponding to a percentage of the particular loop that was executed during the final iteration.

15. The medium of claim 11, wherein the particular loop is an outer loop that includes an inner loop comprising a particular iteration and at least one or more other iterations of the inner loop, the method further comprising:

executing the particular iteration of the inner loop, and during execution of at least the particular iteration of the inner loop and the one or more other iterations for the inner loop and during execution of at least the particular iteration and the one or more other iterations for the inner loop:

storing information that indicates which iteration of the inner loop is being executed;

determining if a trace log condition is met for retaining the stored information for the particular iteration of the inner loop even after the inner loop has finished execution;

wherein, based on determining that the trace log condition is met for at least the particular iteration of the inner loop, storing, in the log, information that identifies the particular iteration of the inner loop and indicates which statements of a plurality of statements in the inner loop were executed during the particular iteration of the inner loop; and wherein, based on determining that the trace log condition is not met for the one or more other iterations, discarding temporarily stored information about the one or more other iterations of the inner loop without storing the information in the log; and storing the log in association with the particular loop of the inner loop, as a summary of how the inner loop was executed, even though the summary omits how the one or more other iterations of the inner loop were executed, wherein the summary includes a loop counter for the inner loop with information that identifies a total number of times the inner loop was executed during the execution of the outer loop.

16. The medium of claim 15, wherein the summary further includes information specifying how many times the inner loop was executed during each iteration of the outer loop.

17. The medium of claim 11, wherein the trace log condition specifies that at least one of:

a current iteration has a difference in a number of statements greater than or equal to a threshold than a previous iteration; and the current iteration includes at least one different statement than a previous iteration.

18. A system comprising:

a non-transitory memory to store machine readable instructions; and a processor to access the memory and execute the machine readable instructions, the machine readable instructions comprising:

a given program comprising a plurality of loops, each of the plurality of loops comprising multiple candidate iterations, wherein each loop in the given program includes a set of executable statements;

wherein a particular loop of the plurality of loops comprises at least a particular iteration and one or more other iterations;

a runtime environment that executes the given program, wherein at least the particular iteration and the one or more other iterations for the particular loop are executed, and during execution of at least the particular iteration and the one or more other iterations for the particular loop:

storing information that indicates which iteration of the particular loop is being executed;

determining if a trace log condition is met for retaining the stored information for the particular loop even after the particular loop has finished execution;

wherein, based on determining that the trace log condition is met for at least the particular iteration, storing, in a log that persists even after the particular loop has finished execution, information that identifies the particular iteration and indicates which statements of a plurality of statements in the particular loop were executed during the particular iteration;

wherein, based on determining that the trace log condition is not met for the one or more other iterations, discarding temporarily stored information about the one or more other iterations without storing the information in the log; and after the particular iteration and the one or more other iterations have been executed, storing the log in association with the particular loop, as a summary of how the particular loop was executed, even though the summary omits how the one or more other iterations were executed.

19. The system of claim 18, wherein the summary includes a loop counter identifying how many iteration of the particular loop was executed.

20. The system of claim 19, wherein the particular loop includes a statement for exiting the particular loop prior to completion of a final iteration of the particular loop and the summary includes an indicia indicating that the particular loop was exited prior to completion of a final iteration of the particular loop.

* * * * *